Figure 1:
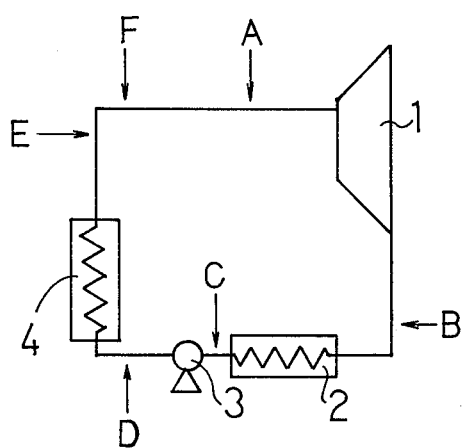

United States Patent [19]

Enjo et al.

[11] Patent Number: 4,465,610

[45] Date of Patent: Aug. 14, 1984

[54] WORKING FLUIDS FOR RANKINE CYCLE

[75] Inventors: Naonori Enjo, Suita; Hideki Aomi; Masahiro Noguchi, both of Osaka, all of Japan

[73] Assignee: Daikin Kogyo Co., Ltd., Japan

[21] Appl. No.: 453,911

[22] Filed: Dec. 28, 1982

[30] Foreign Application Priority Data

Dec. 28, 1981 [JP] Japan .................................. 56-215859
Feb. 12, 1982 [JP] Japan .................................. 57-21814
Feb. 12, 1982 [JP] Japan .................................. 57-21815

[51] Int. Cl.$^3$ ........................... C09K 5/04; F25B 9/00
[52] U.S. Cl. ........................................ 252/67; 252/69; 252/78.1; 252/171
[58] Field of Search .................... 252/67, 78.1, 69, 171

[56] References Cited

U.S. PATENT DOCUMENTS 4,232,525 11/1980 Enjo et al. ............................ 252/67

OTHER PUBLICATIONS

Rochester et al., "Thermodynamic Studies of Fluoro Alcohols 2 Enthalpies and Heat Capacities of Solutions of Liquid Fluoro Alcohols in Water", J. Chem. Soc., Faraday Trans. 1, 1973, 69 (Pt. 7), 1274–81, (Chemical Abstracts 79:77905n).

*Primary Examiner*—John E. Kittle
*Assistant Examiner*—Robert A. Wax
*Attorney, Agent, or Firm*—Larson and Taylor

[57] ABSTRACT

Compositions using for working fluids and heat-transfer media comprising 81 to 100 parts by weight of 2,2,3,3,3-pentafluoropropanol and 0 to 19 parts by weight of water.

6 Claims, 5 Drawing Figures (1)

(2)

(3)

WORKING FLUIDS FOR RANKINE CYCLE

This invention relates to working fluids for use with a Rankine cycle, particularly to working fluids suitable for use with a Rankine cycle utilizing a heat source of relatively low temperature, heat-transfer media and azeotropic compositions.

Water has been heretofore used as working fluids for a Rankine cycle and applied as those to steam engines for a long time. However, water has a limited range of use because of its high freezing point and low vapor density, and requires a larger equipment and achieves a lower efficiency when employing a heat source of relatively low temperature (as low as 200° C.).

Various kinds of organic working fluids have been proposed until now to remedy the defects of water, but a majority of these are inflammable and corrosive, and thus satisfactory working fluids have not been developed. For example, Japanese Examined Patent Publication No. 28271/1976 discloses a mixture of trifluoroethanol and water as a working fluid for a Rankine cycle. The disclosed mixture, although noninflammable and incorrodable, can not form an azeotropic mixture unlike the mixture of the present invention as will be described later and thus is not among the desired working fluids for a Rankine cycle. Further the mixture taught in the publication with the trifluoroethanol having a relatively low flash point of about 40° C. is inappropriate as the working fluid for this purpose. In the present situation as mentioned above, the development of working fluids for a Rankine cycle which are free from the foregoing drawbacks is desired.

It is known to use as a heat-transfer medium water or chlorofluorohydrocarbon. However, they have a boiling point similar to that of water and, there are few heat-transfer media having a boiling point lower than that of water.

Good heat-transfer media are demanded to have properties of being thermally stable and not inflammable and possess a boiling point which is as close as possible to its dew point.

To meet such demand for satisfactory working fluids for a Rankine cycle, we conducted extensive research and found that a mixture of 2,2,3,3-tetrafluoropropanol (hereinafter referred to as TFP) and water can form an azeotropic mixture and is suited to use as a working fluid for a Rankine cycle. This finding was applied for a patent in Japan and laid open to public inspection under Unexamined Patent Publication No. 105652/1979. We continued the research and further discovered that the TFP-water mixture, although capable of forming an azeotropic mixture, has a relatively high boiling point of 90.5° C. as the azeotropic mixture so that the mixture involves relatively high temperature of the heat source and generates a low level of output. Our further investigation revealed that 2,2,3,3,3-pentafluoropropanol (hereinafter referred to as PFP) or a mixture of the same and water is advantageous as a working fluid for a Rankine cycle. The present invention has been accomplished based on this novel finding.

We also found that the mixture meets the demands for the good heat-transfer media.

Generally, in a mixture of two compounds having different boiling points, the composition in the gas phase is different from that in liquid phase. Usually, when such mixture is used as a heat-transfer medium in transferring thermal energy by vaporizing and condensing the mixture enclosed in a sealed tube, a temperature difference occurs between the vaporization and condensation due to the difference between the compositions, leading to reduce the amount of thermal energy to be transferred.

Analyzing the liquid phase composition and vapor phase composition of various mixtures of water and PFP adequate as a heat-transfer, we discovered that a mixture of 94% by weight of PFP and 6% by weight of water has the same composition in liquid phase as that in vapor phase and thus is azeotropic. Our subsequent studies show that a PFP-water mixture containing more than 90% by weight of PFP fulfills the demands for the good heat-transfer media and has a thermal conductivity comparable to or higher than that of PFP alone.

The working fluids according to the invention comprise 81 to 100 parts by weight of 2,2,3,3,3-pentafluoropropanol and 0 to 19 parts by weight of water.

The present working fluids are capable of completely overcoming the drawbacks of known working fluids. First, PFP contained as the active ingredient in the present composition has as high a flash point as more than 60° C. (as measured by a Cleveland open tester), and it is higher than that of TFE heretofore used by more than 20° C. The boiling point of PFP is 80.3° C., lower than that of the conventional TFE (109.0° C.). PFP, in mixture with water, forms an azeotropic mixture, which has a boiling point of 77.3° C., lower than that of the known azeotropic mixture of TFP and water (90.5° C.). Further the present composition has a vapor density about 4 times that of the conventional mixture of TFP and water. With these properties, the working fluids according to the invention are capable of producing a high level of output and are advantageous for use with a Rankine cycle involving a heat source of relatively low temperature.

The Rankine cycle generally refers to the performance of a steam engine, and to an ideal cycle consisting of two adiabatic changes and two isobaric changes. The term Rankine cycle used throughout the specification and claims includes a practical cycle consisting of two substantially adiabatic changes and two substantially isobaric changes.

FIG. 1 is a flow sheet of the Rankine cycle for conversion of thermal energy into mechanical energy.

Figure 2:
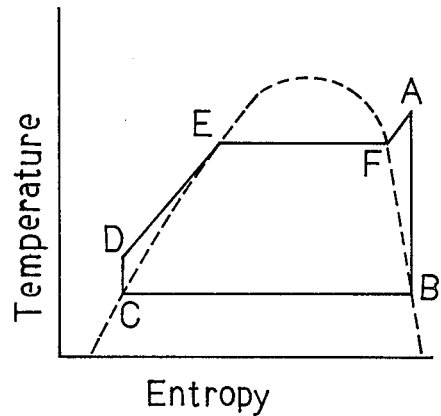

FIG. 2 shows a temperature-entropy diagram in which PFP or a mixture of PFP and water is used as a working fluid. The alphabets appearing in FIG. 1 correspond to those in FIG. 2 which represent points of state of the working fluid. Referring to FIG. 1, 1 designates an expansion device; 2, a condenser; 3, a pump; and 4, an evaporator.

A working fluid in the liquid phase is adiabatically pressurized by the pump 3 (which is shown by the change from C to D), and flows into the evaporator 4 where the liquid-phase working fluid is heated to a vaporization temperature (as indicated by the change from D to E) at which the fluid vaporizes (as represented by the change from E to F) by receipt of heat from a high-temperature heat source. The vapor is then superheated (as shown by the change from F to A), and enters the expansion device 1 in which the superheated vapor is adiabatically expanded. At the time, the temperature and pressure are lowered and the state of the fluid is changed from A to B as shown in FIG. 2 to conduct the work. The vapor-phase working fluid is then sent to the condenser 2 where it is cooled by a low-temperature heat source and liquefied by condensation to get into a liquid phase (as indicated by the change from B to C). Thereafter the fluid is returned to the pump 3 to repeat the cycle.

Usable as the expansion device for a Rankine cycle system are for example rotating or reciprocating displacement expansion devices and turbine expansion devices. Boilers commonly used to produce steam are useful as the evaporator for the system. Illustrative of useful condensers are those of the type as used in refrigerating apparatus. Employable as the pump are pressure liquid feed pumps for organic solvents generally used in chemical industries.

The working fluids for a Rankine cycle according to the invention have the following features.

PFP, particularly PFP mixed with water, is less combustible, and is less inflammable and inexplosive. Generally applications of combustible or explosive working fluids are extremely limited, however the present working fluids are not so.

High stability is among the important properties required of working fluids for a Rankine cycle. PFP is not decomposed at ordinary temperature and is stable in considerably higher than ordinary temperature. Further, PFP as mixed with water neither reacts with water nor decomposes at ordinary temperature and in considerably higher than ordinary temperature, as is the case with PFP singly used.

Metals, particularly iron and steel, are predominantly used as the materials for an energy-converting apparatus of the Rankine cycle. PFP is not corrosive to iron or steel, nor a mixture of PFP and water damages the apparatus by corrosion so seriously as to interfere with a long-period operation of the Rankine cycle apparatus. PFP is free from decomposition as stated above and does not produce any foreign substance in the working fluid system which substance will hinder the Rankine cycle operation.

The critical temperature of PFP is 224.5° C., and that of a mixture of PFP and water is higher than 224.5° C. For this reason, a PFP-water mixture is advantageous for use with the Rankine cycle.

The most desirable characteristics of Rankine cycle working fluids from thermodynamic viewpoints are such that the line for the working fluid in the state of saturated gas shown in FIG. 2 (the right side portion of a dotted line in FIG. 2) is parallel to the isoentropic line. In a Rankine cycle system using a working fluid having such characteristic, heat emanated from a heat source can be effectively utilized.

Figure 3:
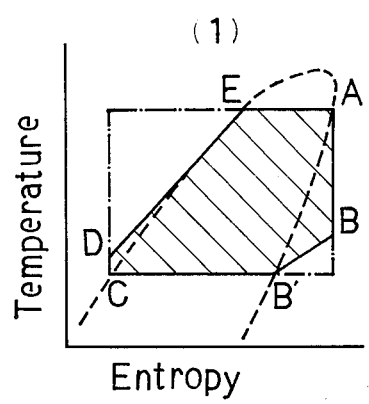
Figure 3:
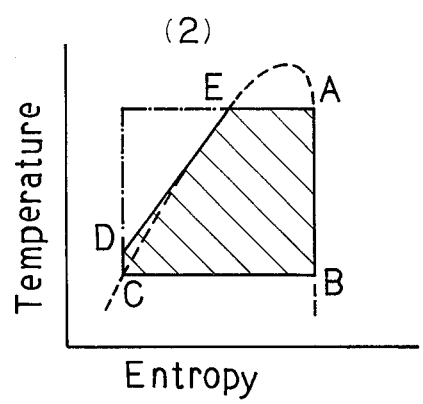
Figure 3:
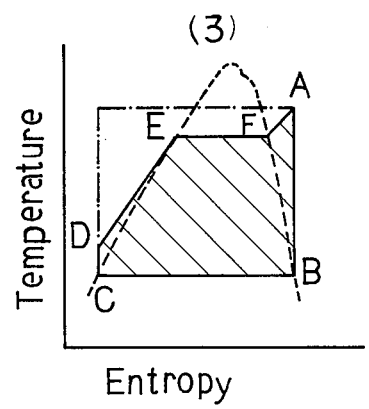

FIG. 3 shows typical temperature-entropy diagrams resulting from Rankine cycle operations conducted by using three different types of media. The work achieved in each operation relative to a given calorie from a heat source corresponds to a block marked with oblique lines and surrounded with each cycle (A, B, [B'], C, D, E, [F]). The counterpart in Carnot's cycle is rectangular. In FIG. 3, (1), the medium is run off as a superheated gas from the outlet of the turbine (point B) so that the temperature difference occuring on adiabatic expansion of the medium in the turbine (A-B process) is utilized with reduced effectiveness. In FIG. 3, (3), a device for superheating a gas is disposed behind the evaporator and in front of the expansion device to prevent the medium from egressing as a wet gas from the outlet of the turbine. Thus in this case, a gas-superheating process (F-A process) is required and the hatched block is far smaller than the counterpart in Carnot's cycle so that the operation is carried out with decreased cycle efficiency. In FIG. 3, (2), the line for the saturated steam is identical in gradient with the isoentropic line, which means that a medium showing such a diagram has the most excellent properties.

Temperature-entropy diagrams derived from the use of PFP alone or combinations of PFP and water are as follows: the single use of PFP ends with the diagram of the type as shown in FIG. 3, (1); a mixture of PFP and water containing less than 6.0% by weight of water, the diagram of the type in FIG. 3, (1); a mixture of PFP and water, containing more than 6.0% by weight of water, the diagram of the type in FIG. 3, (3); and a PFP-water mixture with a water content of about 6.0% by weight, the diagram of the type in FIG. 3, (2).

Figure 4:
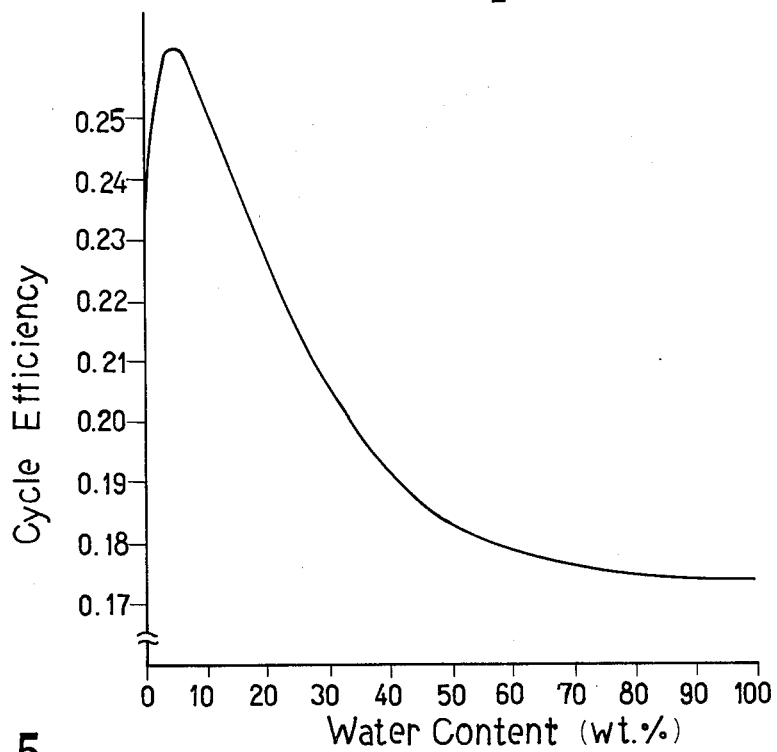

FIG. 4 is a graph showing the relationship between a water content in a PFP-water mixture and a cycle efficiency. As the proportion of water to PFP-water mixture increases, the cycle efficiency is elevated until the efficiency reaches the maximum value at the water content of 6.0% by weight, namely a PFP-water ratio of 94:6. However, further increase of the water content reduces the cycle efficiency which, with an increase in water content up to more than 19% by weight, decreases below the efficiency value attained by single use of PFP. It follows that the good cycle efficiency can be achieved by using the working fluids comprising 81 to 100 parts by weight of PFP and 0 to 19 parts by weight of water according to the invention.

One of the most marked thermodynamic characteristics of PFP is to form an azeotrope in mixture with water. This characteristic exhibits outstanding actions in a Rankine cycle system even utilizing a low-temperature heat source and having a high temperature range in the vicinity of 200° C. Tests were conducted by distilling mixtures of PFP and water in varying proportions at atmospheric pressure to determine the composition of evolved gases. Table 1 below shows the results. It is apparent from Table 1 that when a mixture comprises 94.0% by weight of PFP and 6.0% by weight of water, the liquid-phase composition corresponds to the vapor-phase composition, which means that the mixture is azeotropic. This azeotropic mixture boils at 77.3° C. Table 2 below shows the vapor pressure of the mixture in comparison with that of water at various temperatures.

TABLE 1

| | | Sample No. | | | | | | | |
|---|---|---|---|---|---|---|---|---|---|
| | | 1 | 2 | 3 | 4 | 5 | 6 | 7 | 8 |
| Vapor-phase composition (wt. %) | PFP | 100 | 97.9 | 95.2 | 94.5 | 94.0 | 93.2 | 92.7 | 92.3 |
| | water | 0 | 2.1 | 4.8 | 5.5 | 6.0 | 6.8 | 7.3 | 7.7 |
| Liquid-phase composition (wt. %) | PFP | 100 | 98.2 | 95.5 | 94.6 | 94.0 | 92.1 | 90.9 | 89.3 |
| | water | 0 | 1.8 | 4.5 | 5.4 | 6.0 | 7.9 | 9.1 | 10.7 |
| Vapor-liquid | PFP | 1.000 | 0.997 | 0.997 | 0.999 | 1.00 | 1.01 | 1.02 | 1.03 |

TABLE 1-continued

| | Sample No. | | | | | | | |
|---|---|---|---|---|---|---|---|---|
| | 1 | 2 | 3 | 4 | 5 | 6 | 7 | 8 |
| composition ratio water | — | 1.17 | 1.07 | 1.02 | 1.00 | 0.86 | 0.80 | 0.72 |

TABLE 2

| | (Unit: kg/cm² abs) | | | |
|---|---|---|---|---|
| | 40° C. | 100° C. | 150° C. | 200° C. |
| PFP-water azeotropic mixture | 0.213 | 2.27 | 9.26 | 27.2 |
| water | 0.075 | 1.033 | 4.85 | 15.9 |

An expansion device is one of the most important machines in a Rankine cycle equipment. The miniaturization of an expansion device is a very significant subject in the development of a Rankine cycle equipment, particularly because of the resulting economical advantages. The size of the expansion device constituting an important factor depends on the vapor volume per unit output of the device at the time of egress of the working fluid from the device. That is, a working fluid is evaluated as the better fluid with an increase in the entropy difference of the fluid between at the inlet and at the outlet of the device on the basis of the vapor volume at the time of egress of the fluid from the device, because such working fluid gives large work load (output of power) by use of a small-sized expansion device. It is known that the ability of a working fluid is virtually proportional to its vapor pressure. For this reason, the higher the vapor pressure of a working fluid at the outlet of an expansion device, the smaller the expansion device can be made.

As shown in Table 2, the vapor pressure of a PFP-water azeotropic mixture at 40° C. is about 2.84 times that of water. An expansion device can be miniaturized in proportion to this degree. Therefore, a PFP-water azeotropic mixture has a considerable superiority as a working fluid over water.

The PFP-water mixture of this invention forms an azeotropic mixture when it consists of 94.0% by weight of PFP and 6.0% by weight of water and has an azeotropic-like composition when comprising at least 81% by weight of PFP and less than 19% by weight of water. With the ingredients in the above proportions, the present mixture has a low boiling point and enables the use of a low-temperature heat source, giving other additional advantages derived from these features. On the other hand, a TFE-water mixture can not form an azeotropic mixture and thus can not provide the merits attributed to the azeotropy as in the present invention.

It is well known that with an expansion device of the turbine type, a working fluid having a large vapor density, that is its vapor is heavier, is superior to one having smaller density, because the former produces a larger output than the latter, in the case of using the same device. The molecular weight of PFP is about 150 and is far larger than that of water (about 18). The vapor density of a PFP-water azeotropic mixture at 40° C. is about 16.5 times that of steam and therefore the PFP-water mixture has a large superiority as a working fluid over water when a turbine-type expansion device is used.

While the PFP-water mixture according to the invention can be employed as a working fluid for a Rankine cycle without any additive, it may be used in combination with suitable hydrocarbons or synthetic lubricating oils.

Hereinafter discussed is the azeotropic composition according to the invention comprising 94.0 parts by weight of PFP and 6.0 parts by weight of water. This azeotropic composition has a boiling point of 77.3° C. PFP-water mixtures in various proportions were enclosed in a sealed tube to measure the amount of heat transferred and the temperature of the tube. As a result, it was found that the azeotropic mixture achieved the largest amount of heat transferred and induced the smallest temperature difference between the heat-radiating portion and the heat-receiving portion of the tube, hence it is most efficient in the transfer of thermal energy.

The azeotropic composition having these properties are not only advantageous as a working fluid for the Rankine cycle and as a heat-transfer medium, but also usable for other purposes, for example, as solvents (e.g. solvents for extraction).

The heat-transfer media according to the invention comprise 90 to 100 parts by weight of PFP and 0 to 10 parts by weight of water. The heat-transfer media can fulfil any of the requirements of good heat-transfer media. First the present heat-transfer media are high in thermal stability and thus can be used at high temperatures between about 50° C. and about 250° C. The measurement of the present media by a Cleveland open tester reveals that the present media have the properties of being noninflammable even at 60° C. This means that the present heat-transfer media possess the properties of being scarcely inflammable.

Conventional TFE-water type compositions can not form azeotropic compositions and are inflammable. Known compositions of tetrafluoropropanol and water are low in thermal stability and have a relatively high boiling point, hence unsuitable for use. On the other hand, PFP boils at 80.3° C. and a PFP-water azeotropic mixture at a low temperature of 77.3° C., consequently posing no problem in practical use.

The heat transfer-media according to the invention are usable for example for heat pipes or vapor refrigerating systems.

For better understanding of the invention, an example is given below.

EXAMPLE

PFP alone and a mixture of PFP and water were analyzed with respect to the composition in the liquid phase and in the vapor phase. Table 1 given above shows the results. From Table 1, it is seen that the composition in the vapor phase is equal to that in the liquid phase as in Sample No. 5.

Figure 5:
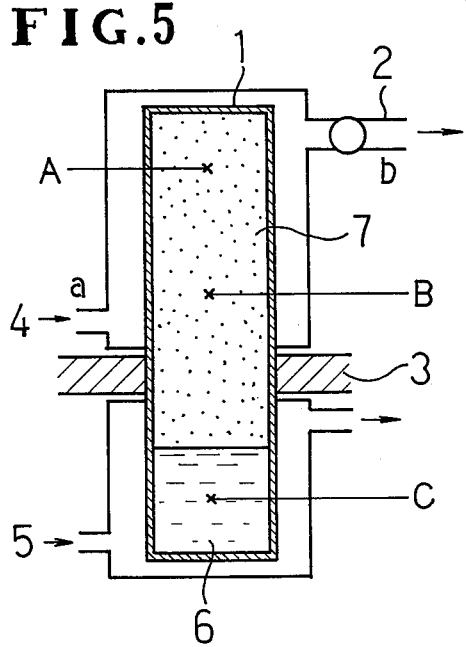

Samples Nos. 1 to 8 in Table 1 were checked for the thermal conductivity when employed in a heat pipe. The tests were conducted by using a heat transmission tester indicated in FIG. 5. Referring to FIG. 5, heating water having a constant temperature (60° C.) was fed to the tester and, the temperature at points of temperature sensors A, B and C and the increase in the temperature of the cooling water were measured. The amount of heat transferred Q (W) is given by the equation $$Q = cu(b' - a')$$

wherein a' (°C.)=temperature of cooling water at the inlet; b' (°C.)=temperature of cooling water at the outlet; u (g/s)=flow rate of cooling water and c (J/g.°C.)=specific heat of cooling water.

The temperature of the cooling water at the inlet was 20° C. Table 3 below shows the results obtained. From the table it is clear that the azeotropic mixture is the most excellent and that the mixtures close to the azeotropic mixture in the composition exhibit effects comparable to that of the azeotropic mixture.

In FIG. 5, indicated at 1 is a copper pipe; at 2, a flow rate meter; at 3, a heat insulator (urethane foamed product); at 4, cooling water; at 5, heating water; at 6, liquid phase; at 7, vapor phase. Reference characters A, B, and C designate temperature sensors of the media; a, a temperature sensor of the cooling water at the inlet; and b, a temperature sensor of the cooling water at the outlet.

TABLE 3

| Sample No. | Temperature of heat-transfer medium | | | Amount of heat transferred (W) |
|---|---|---|---|---|
| | A | B | C | |
| 1 | 46.4 | 46.0 | 46.0 | 101 |
| 2 | 46.4 | 46.0 | 45.9 | 101 |

TABLE 3-continued

| Sample No. | Temperature of heat-transfer medium | | | Amount of heat transferred (W) |
|---|---|---|---|---|
| | A | B | C | |
| 3 | 46.3 | 46.0 | 45.9 | 101 |
| 4 | 46.4 | 46.1 | 46.0 | 103 |
| 5 | 46.4 | 46.1 | 46.1 | 103 |
| 6 | 46.3 | 46.1 | 45.9 | 101 |
| 7 | 46.3 | 45.9 | 45.9 | 100 |
| 8 | 46.3 | 45.8 | 45.8 | 99 |

We claim:

1. Aqueous working fluids for use with a Rankine cycle comprising at least 81 parts by weight of 2,2,3,3,3-pentafluoropropanol and up to 19 parts by weight of water.

2. Aqueous heat-transfer media comprising at least 90 parts by weight of 2,2,3,3,3-pentafluoropropanol and up to 10 parts by weight of water.

3. An azeotropic composition comprising 94.0 parts by weight of 2,2,3,3,3-pentafluoropropanol and 6.0 parts by weight of water.

4. In the operation of a Rankine cycle wherein a working fluid is employed, the improvement which comprises using as the working fluid the aqueous composition of claim 1.

5. In the operation of a Rankine cycle wherein a working fluid is employed, the improvement which comprises using as the working fluid the aqueous composition of claim 2.

6. In the operation of a Rankine cycle wherein a working fluid is employed, the improvement which comprises using as the working fluid the aqueous composition of claim 3.

* * * * *